(12) United States Patent
Tachibana et al.

(10) Patent No.: US 6,873,882 B2
(45) Date of Patent: Mar. 29, 2005

(54) ZONE CONTROLLER

(75) Inventors: Toshiyuki Tachibana, Kasai (JP); Shinji Furotani, Kasai (JP)

(73) Assignee: Itoh Electric Company Limited, Hyogo (JP)

(*) Notice: Subject to any disclaimer, the term of this patent is extended or adjusted under 35 U.S.C. 154(b) by 0 days.

(21) Appl. No.: 10/296,755

(22) PCT Filed: Jun. 14, 2002

(86) PCT No.: PCT/JP02/05989
§ 371 (c)(1),
(2), (4) Date: Nov. 27, 2002

(87) PCT Pub. No.: WO03/000574
PCT Pub. Date: Jan. 3, 2003

(65) Prior Publication Data
US 2003/0135299 A1 Jul. 17, 2003

(30) Foreign Application Priority Data
Jun. 20, 2001 (JP) ........................ 2001-186692

(51) Int. Cl.⁷ .............................................. B65G 7/00
(52) U.S. Cl. ................ 700/230; 198/460.1; 198/781.06
(58) Field of Search ................................. 700/230, 224, 700/225, 228, 229; 198/460.1, 860.3, 781.1, 781.6

(56) References Cited

U.S. PATENT DOCUMENTS 6,370,447 B1 * 4/2002 Miyazaki .................... 700/230
6,522,943 B2 * 2/2003 Dierauer .................... 700/223
6,522,944 B2 * 2/2003 Majcher et al. ............. 700/224
6,701,214 B1 * 3/2004 Wielebski et al. .......... 700/224
6,792,332 B1 * 9/2004 DePoi ........................ 700/213

FOREIGN PATENT DOCUMENTS

JP          4-226212       8/1992
JP         11-199030       7/1999

* cited by examiner

Primary Examiner—Khoi H. Tran
(74) Attorney, Agent, or Firm—Wood, Phillips, Katz, Clark & Mortimer

(57) ABSTRACT

The present invention aims to provide a zone controller that enables construction of a conveyor line adapted for articles having various shapes and weights.

The zone controller includes: an output terminal 15 for output of a driving status signal representing a driving status of the driving roller; an input terminal 16 for input of a driving status signal; and a controlling section 10 for generating a controlling signal for controlling the driving roller. The controlling section is capable of being switched between a master control mode and a slave control mode. In the master control mode, the controlling section generates the controlling signal by determining the need for driving the driving roller and outputs a driving status signal equivalent to the controlling signal via the output terminal 15, and in the slave control mode, by employing a driving status signal transmitted via the input terminal 16 as the controlling signal, the controlling section controls the driving roller synchronously with the control by the zone controller 1 from which the driving status signal is transmitted.

16 Claims, 10 Drawing Sheets

ZONE CONTROLLER

BACKGROUND OF THE INVENTION

1. Field of the Invention

The present invention relates to a zone controller for use in a zone controlled conveyor system. More specifically, it relates to one of zone controllers that enable construction of a conveyor line that is adapted for the shape or weight of the articles to be conveyed, by actuating adjacent zones for control solely or jointly by switching wiring and/or setting of the zone controllers.

2. Description of Related Art

A conventional roller conveyor system that has a conveying line divided into a plurality of control zones, each zone having a conveyor unit having a zone controller is disclosed, for example, in Japanese Laid-open Patent Application No. Hei. 11-199030.

The conventional roller conveyor system is equipped with a motorized roller and "free rollers" both for conveyance, the motorized roller and free rollers connected by belts spanned over them. Each unit has a photoelectric switch for detecting the presence of article and a "motor driver", i.e., a controller, for controlling operation of the motorized roller.

Each of the zone controllers, connected to others, drives, brakes and stops the rotation of the roller depending on the signal of presence of article of its own zone and taking into account the signals of presence etc. transmitted from upstream and downstream zones. Such cooperative control by zone controllers achieves the "zero-pressure accumulating control" that enables conveying articles avoiding collision between articles.

More specifically, such roller conveyor system has a plurality of arranged units of a common shape, each unit corresponding to each control zone, the number of the units being that required depending on the length of the conveyor line, so as to enable the "zero-pressure accumulating conveyance" by means of distributed control.

Though such conveyor systems have advantage that they can meet many purposes by using units of a common shape and specifications, on the other hand, they have disadvantages that have been caused by the fact that the units have the same shape and the same conveying capability.

For example, as shown in FIG. 11, if the conveyed article W is longer than the unit U, normal "zero-pressure accumulation conveyance" cannot be made because the article W covers a plurality of units Ua and Ub. Therefore, when a long article is to be conveyed, it have to be positioned so that it extends crosswise to the length of the unit U, thus preventing stable conveyance.

As shown in FIG. 12, if the width of the conveyed article W is larger than the width of the unit U, the article W is supported unstably, thus preventing stable conveyance.

Moreover, even if the shape of the article W is within the limit of the unit U, in the case that the article W has a weight over the conveying capacity of the unit U or in the case that the unit Ub is positioned inclined upward or downward as shown in FIG. 13, disadvantage that driving force or braking force for the conveyance is not sufficient is caused.

Therefore, if stable conveyance adapted for various shapes and weights of the conveyed articles and inclining conditions of the conveyor lines is intended, a lot of conveyor units having various shapes and specifications should be provided, thus complicating construction of the conveyor line and increasing the cost. Improvement has been desired.

The invention disclosed in this application is proposed in consideration of the above-mentioned situations, aiming to provide a zone controller that enables conveyance of articles having various shapes and weights by means of actuating a plurality of units jointly by switching the modes of the zone controller of each unit and/or by changing wiring between the controllers.

DISCLOSURE OF THE INVENTION

The zone controller of the invention proposed for achieving the above-described aim is:

a zone controller for a particular zone picked from a plurality of zones for control into which a roller conveyor line is divided and which are arranged in the direction of conveyance, being capable of controlling operation of a driving roller for conveyance provided in the particular zone, including: an output terminal for output of a driving status signal representing a driving status of the driving roller to another zone controller; an input terminal for input of a driving status signal transmitted from another zone controller; and a controlling section for generating a controlling signal for controlling the driving roller: wherein the controlling section is capable of being switched between a master control mode and a slave control mode, wherein in the master control mode the controlling section generates the controlling signal by determining the need for driving the driving roller and outputs a driving status signal equivalent to the controlling signal via the output terminal to another zone controller, and wherein in the slave control mode, by employing a driving status signal transmitted from another zone controller via the input terminal as the controlling signal, the controlling section controls the driving roller synchronously with the control by the zone controller from which the driving status signal is transmitted. Switching between the master control mode and the slave control mode may be performed by setting a pre-determined signal compulsorily to a desired value using a switch etc. or by forming a logic circuit enabling switching between the master and slave control modes by changing wiring between the controllers.

The zone controller of the invention is favorably adopted in a conveyor line performing a zero-pressure accumulating conveyance in which collision between conveyed articles is avoided in conveying the articles downstream by performing controls of conveyance in the zones cooperatively over the zones. Preferably articles in the zones are conveyed in a uniform speed.

For convenience sake, in the following description, a zone for control should correspond to a conveyor unit. However, each zone for control does not necessary correspond to a singular and independent unit. For example, the driving rollers for conveyance may be driven by providing a plurality of zones for each unit and providing one zone controller for each zone.

The zone controller of the invention enables control of conveyance in which the control by the controller is capable of being switched between a master control mode and a slave control mode.

In the master control mode, control is performed by generating a controlling signal by determining the need for driving the driving roller and outputting a driving status signal equivalent to the controlling signal via an output terminal to another zone controller.

In the slave control mode, control is performed by employing, as a controlling signal, a driving status signal transmitted via an input terminal from another zone controller, without determining the need for driving the driving roller.

In other words, the zone controller of the invention enables switching between the master control mode in which conveyance is performed by determining the need for driving the driving roller and the slave control mode in which operation is performed synchronously with the drive of a driving roller by another controller.

A variety of conveyor systems can be formed by employing units for control (also called "control units") using the zone controller of the invention.

For forming an embodiment of the conveyor system, a plurality of units are arranged in a line in the direction of conveyance so as to form groups each consisting of a predetermined number of adjoining units. One zone controller in each group is set to perform a master control, whereas any other zone controller in the group is set to perform a slave control. The output terminal of the zone controller performing the master control is connected to the input terminal of each zone controller performing the slave control. Thus the driving rollers in each group are driven synchronously and conveyance is performed with each group as a virtually integrated zone for control.

In the conveyor system such formed, by making groups each consisting of two units or three units arranged in the direction of conveyance, new and virtually prolonged zones for control are formed.

Thus, a stable zero-pressure accumulation conveyance is performed for each article having length exceeding the length of the unit by merely switching the mode of the zone controller.

For forming another embodiment of the conveyor system, a plurality of units are arranged in parallel with the direction of conveyance so as to form groups each consisting of a predetermined number of laterally adjoining units. One zone controller in each group is set to perform a master control, whereas any other zone controller in the group is set to perform a slave control. The output terminal of the zone controller performing the master control is connected to the input terminal of each zone controller performing the slave control. Thus the driving rollers in each group are driven synchronously and conveyance is performed with each group as a virtually integrated zone for control.

In the conveyor system such formed, by making groups each consisting of units arranged laterally, new and virtually widened zones for control are formed. Thus, articles are stably conveyed, being carried on both units arranged side by side.

Thus, even in the case that a conveyed article has a width larger than the width of each conveyor unit or a weight over the limit of each conveyor unit, or in the case that the unit is positioned inclined so as to be liable to shortage of conveying force or braking force, the article is conveyable merely by changing control in the zone controllers.

For forming still another embodiment, groups each consisting of a predetermined number of adjoining subgroups arranged in series, each subgroup made of units arranged laterally, may be formed.

In the conveyor system such formed, new zones each having virtually enlarged length and width are formed.

Thus, a stable zero-pressure accumulation conveyance is enabled for articles each having a large shape or a large weight over the limit of the conveyor unit.

In the embodiment, the controlling section in the master control mode may determine the need for driving the driving roller taking into account driving status of a driving roller or presence status in at least one zone including the particular zone. Here, "presence status" means "whether an article is present or absent in the zone".

For example, it can determine the need for driving the driving roller to perform a zero-pressure accumulation conveyance taking into account the presence status of the particular zone and the immediately adjacent upstream and downstream zones.

It can also determine the need for driving the driving roller to perform a zero-pressure accumulation conveyance taking into account, adding to the presence status, the driving status of the driving roller of the downstream zone immediately adjacent to the particular zone.

In particular, by taking into account the driving status of the immediately adjacent downstream zone, even if articles are present in the particular zone and all the zones on upstream and downstream of the particular zone, all articles in the particular zone and the upstream zones can be conveyed simultaneously if the driving status of the immediately adjacent downstream zone is "drive", thus enabling an efficient conveyance without a zone in which no article is present.

The invention is concerned with a conveyor system including a first conveyor unit forming a part of a conveyor line and a first controller related to the first conveyor unit. In the conveyor system, the first conveyor unit has a driving motor for conveying articles on the conveyor line, and the first controller includes a calculating circuit for determining the need for actuating the motor, taking a predetermined parameter into account, so as to generate a first signal; an input terminal for input of a second signal from outside; a signal-generating circuit (a driving status signal generating circuit) for generating a third signal based on the first signal and/or the second signal; and an output terminal for output of the third signal to outside.

In the conveyor system of the invention described above, the conveyor line may further include a second conveyor unit arranged in series with the first conveyor unit, a second controller related to the second conveyor unit, and a first wire electrically connecting an output terminal of the second controller and the input terminal of the first controller. With this arrangement, the third signal generated by the second controller can be inputted into the first controller as its second signal so as to control operation of the driving motor of the first conveyor unit subject to that of the second conveyor unit.

The conveyor line may further include a third conveyor unit arranged in parallel with the first conveyor unit, a third controller related to the third conveyor unit, and a second wire electrically connecting an output terminal of the third controller and the input terminal of the first controller.

The invention is also concerned with a controller for controlling the operation of a driving motor for conveyance in a first conveyor unit, which forms a part of a conveyor line. The controller includes a calculating circuit for determining the need for actuating the motor, taking a predetermined parameter into account, so as to generate a first signal; an input terminal for input of a second signal from outside; a signal-generating circuit for generating a third signal based on the first signal and/or the second signal; and an output terminal for output of the third signal to outside. As a predetermined parameter, a detect signal of a presence sensor detecting whether an article is present on the first conveyor unit and/or whether an article is present on other conveyor units upstream or downstream of the first conveyor unit may be used. Signal representing a driving status of other conveyor units upstream or downstream of the first conveyor unit also may be used. The calculating circuit and the signal-generating circuit may be a logic circuit formed by combining suitable logic calculator or may be formed by a microcomputer. The signal-generating circuit may generate a third signal through logic calculation based on a first signal and a second signal. A singular controller or a plurality of controllers may be provided corresponding to the first conveyor unit.

By connecting the input terminal of one controller to an output terminal of another controller, the driving motor in a first conveyor unit can be controlled so that it follows a slave control in which it simulates the driving motor for conveyance controlled by the other controller, for the third signal of the other controller is inputted as the second signal of the one controller and the third signal of the one controller can be generated based on the second signal. If no signal is inputted via the input terminal, it is possible to perform control of operation of the motors depending on determination by the calculating circuit of need for actuating the motors.

The controller of the invention may further comprise a motor-controlling circuit electrically connected to the motor and capable of receiving the third signal. The motor-controlling circuit may generate a drive control signal for actuating or halting the motor based on the third signal, and outputting the drive control signal to the motor.

In the controller, each of the first, the second, and the third signals may be a digital signal representing one of "drive" and "halt", and the signal-generating circuit may be formed or programmed so as to generate a third signal representing drive if the second signal represents drive.

Each of the first, the second, and the third signals may be a digital signal representing one of drive and halt, and the signal-generating circuit generates a third signal representing drive regardless of the first signal if the second signal represents drive.

Each of the first, the second, and the third signals may be a digital signal representing one of drive and halt, and a setting device for setting the first signal compulsorily to represent one of drive and halt regardless of the parameter, which is used in the calculation by the calculating circuit, may further be provided. Thus, by switching the setting device, a signal-generating circuit that outputs the second signal as the third signal regardless of the original first signal calculated based on a predetermined parameter can be formed simply and easily.

Each of the first, the second, and the third signals may be a digital signal representing one of drive and halt, a plurality of external signal input terminals for receiving a parameter from outside of the controller may further be provided, and, with no signal inputted via the external signal input terminals, the calculating circuit may generate the first signal representing one of drive and halt, and the signal-generating circuit may generate the third signal representing drive if the second signal represents drive and representing halt if the second signal represents halt, regardless of the first signal.

Preferably the input terminal and the output terminal have connectors of the same shape.

THE PREFERRED EMBODIMENTS OF THE INVENTION

Now some preferred embodiments of the present invention will be described referring to the accompanying drawings.

Figure 1:
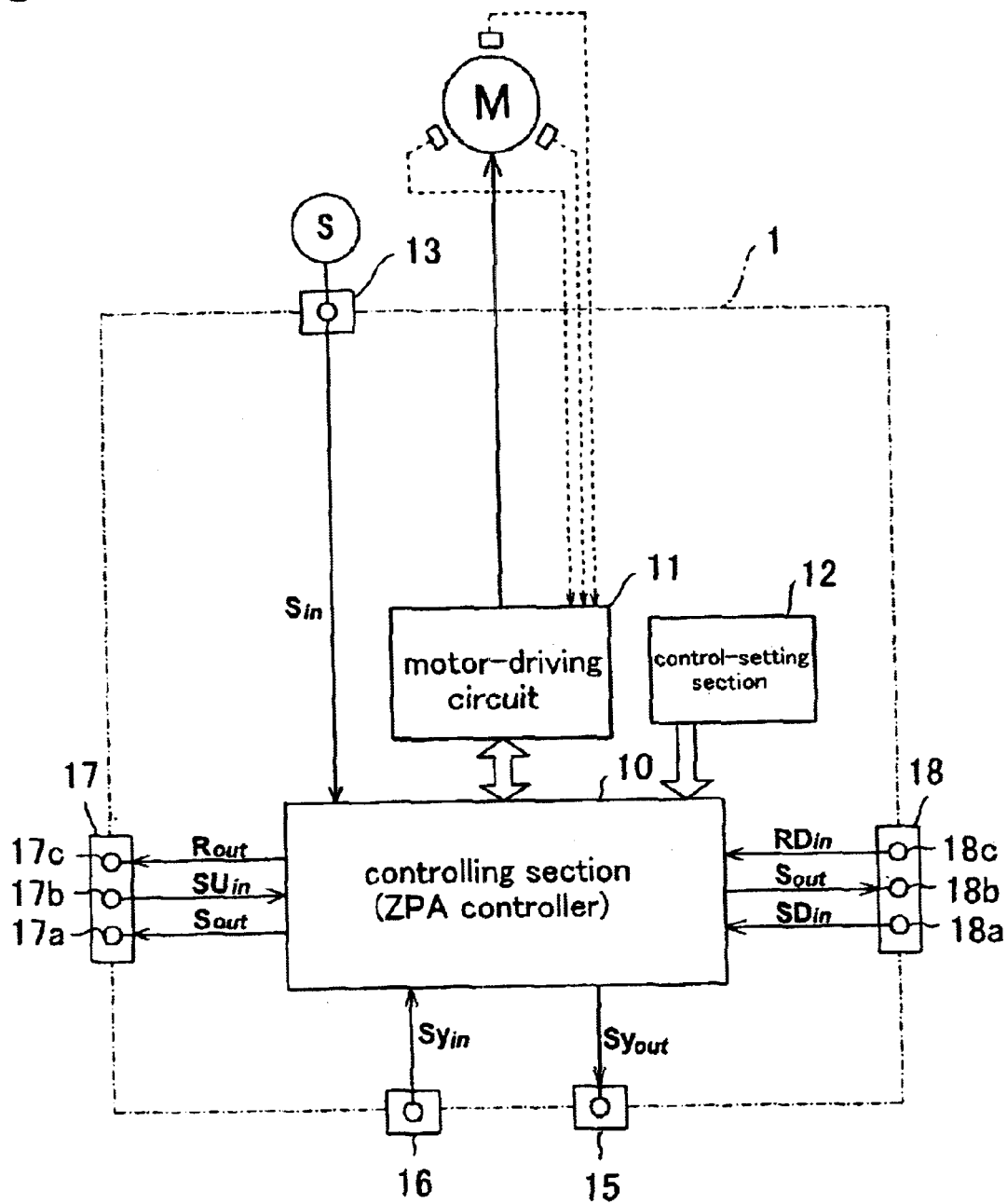
FIG. 1 is a block diagram of a zone controller embodying the invention.

FIG. 1 is a schematic block diagram illustrating the internal structure of a zone controller 1 embodying the invention. Each conveyor unit U can be equipped with one of the zone controllers 1. The conveyor unit U may be of a known shape or any suitable shape evolved from the known shape. For example, the conveyor unit U may be constructed by arranging conveying rollers in the conveying direction and between frames on both sides, connecting the rollers so that they move together, as shown in FIGS. 2 to 5. Such a connection enables all conveying rollers to rotate in the same direction and same speed by driving at least one roller to rotate. The roller that is driven to rotate is hereinafter referred to as "driving roller". The driving motor for driving the driving roller may be incorporated in the driving roller itself or may be equipped out of the roller. Each unit U can have a "presence sensor" S that detects the presence or absence of the article on the unit. The signal from the sensor S can be inputted into the zone controller 1. The presence sensor S may be of any type, for example, a photosensor or a load sensor. Though the presence sensor S is preferably situated in the middle part in the conveying direction, the invention is not limited to the particular situation of the sensor.

The zone controller 1 is electrically connected to the presence sensor S and a driving motor M that drives the driving roller (not shown) to rotate. The zone controller 1 includes a controlling section 10, a motor-controlling circuit 11 and a control-setting section 12. The controlling section 10 controls the driving motor M so as to perform a zero-pressure accumulation conveyance control. The motor-controlling circuit 11 actuates the driving motor M on receiving a controlling signal RUN, i.e., the third signal, generated by the controlling section 10. The control-setting section 12 performs setting of various sections including the control of the controlling section 10.

The zone controller 1 also has a presence signal terminal 13, an output terminal (output connector) 15, and an input terminal (input connector) 16. A presence signal Sin from the presence sensor S is to be inputted into the presence signal terminal 13. The output terminal 15 is for outputting a driving status signal Syout, i.e., the third signal, which represents the driving status of the driving motor M, to another zone controller. A driving status signal Syin, i.e., the second signal, which is outputted from another zone controller, is to be inputted into the input terminal 16.

The zone controller 1 also has an upstream connector 17, which is to be connected to a zone controller 1 in the upstream, and a downstream connector 18, which is to be connected to a downstream zone controller 1.

The controlling section 10 determines whether to actuate the driving motor M or not by receiving a presence signal Sin of its own zone, a presence signal SUin of an upstream zone, a presence signal SDin of a downstream zone, and a driving status signal RDin of a downstream zone. The signal Sin is to be outputted from a presence sensor S. The signal SUin is to be transmitted via a terminal 17b of the upstream connector 17. The signal SDin and RDin are to be transmitted via terminals 18a and 18c of the downstream connector 18.

The controlling section 10, by taking into account the presence signal Sin of its own zone, the presence signal SUin of an upstream zone, the presence signal SDin of a downstream zone, and the driving status signal RDin of the downstream zone, and by performing logic operations based on these parameters, determines the need of actuating the driving motor M, generates control signal, i.e., the third signal, which instructs whether to actuate or to halt the motor M, and outputs the control signal to the motor-controlling circuit.

When the controlling section 10 determines that it is necessary to actuate the driving motor M, the controlling section 10 outputs a control signal RUN to the motor-controlling circuit 11 so as to actuate the motor M and in turn to drive the driving roller.

The zone controller 1 in the embodiment is capable of outputting, via output terminal 15, a driving status signal Syout, which is in this embodiment identical with the driving status signal that is outputted via terminal 17c. The driving status signal Syin, which is transmitted from another zone controller 1 via input terminal 16, is to be inputted into the controlling section 10. The driving status signal may be the above-mentioned control signal itself, or any signal generated based on the control signal.

The controlling section 10 outputs a presence signal Sout and a driving status signal Rout, both of its own zone, via the terminals 17a and 17c, respectively, of the upstream connector 17. The controlling section 10 also outputs a presence signal Sout of its own zone via the terminal 18b of the downstream connector 18.

Such a zone controller 1 performs a master control in which the controlling section 10 determines the need of actuating the driving motor M by transmitting and receiving presence signals and driving status signals mutually with other zone controllers 1 in the upstream and downstream via the upstream connector 17 and the downstream connector 18.

On the other hand, by inputting a driving status signal transmitted from another zone controller 1 via the input terminal 16, with the upstream connector 17 and the downstream connector 18 open, the controlling section 10 is capable of performing subordinate or slave control, that is, control subject to the transmitted driving status signal.

In other words, the zone controller 1 of the embodiment is capable of switching the master control mode and the slave control mode merely by changing wiring, without particular setting for switching. Thus a driving motor M connected to another zone controller is to be controlled based on a driving status signal generated by a controlling section of a zone controller. More detailed structure of the zone controller 1 will be described later.

The invention is not limited to the embodiment in which master control mode and slave control mode are switched by changing wiring between zone controllers 1. For example, a control-setting section 12 including switches may be used to switch the master control and the slave control.

A variety of conveyor lines can be constructed by using a control unit having the zone controller 1 of the embodiment. Examples of the conveyor lines are described below.

CONVEYOR LINE EXAMPLE 1

Figure 2:
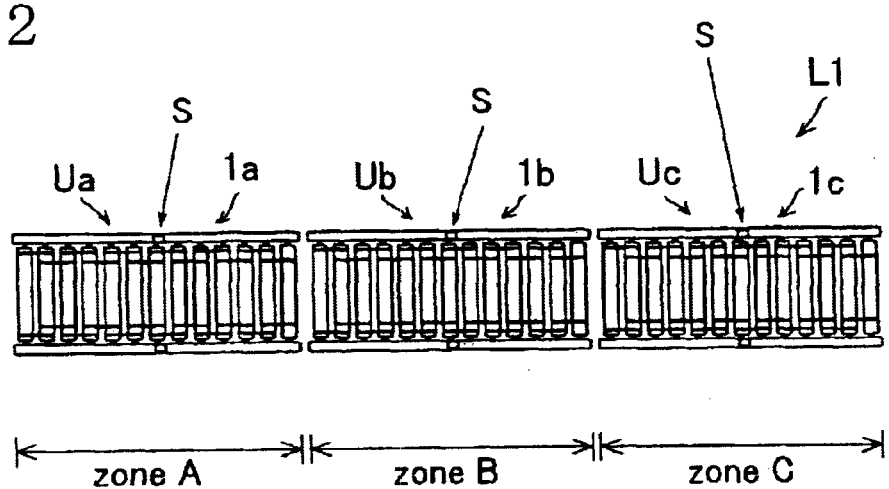
FIG. 2 is a plan view of a conveyor line made up of conveyor units each equipped with the zone controller shown in FIG. 1.
Figure 6:
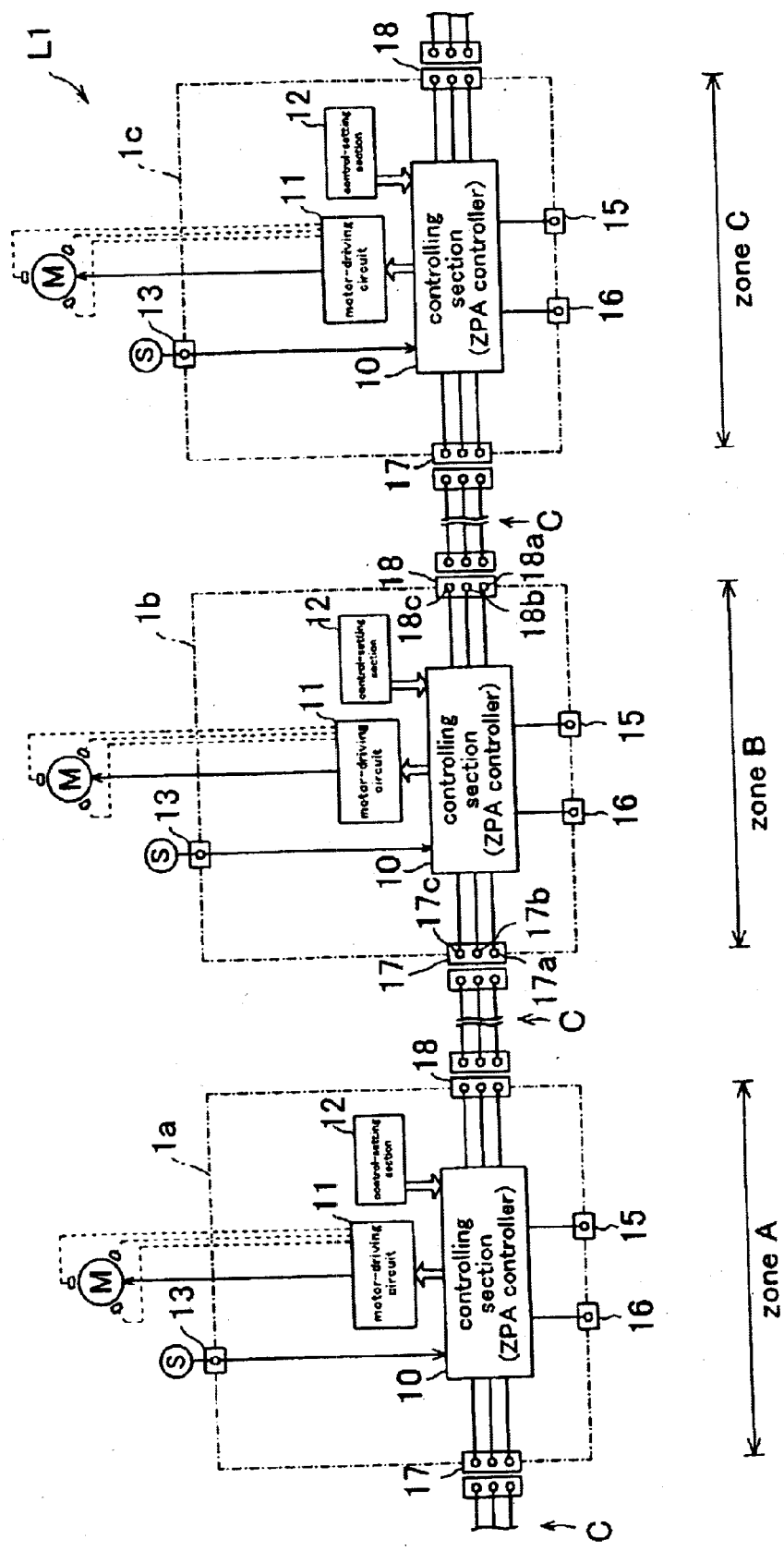
FIG. 6 is a wiring diagram of the zone controllers corresponding to the conveyor line shown in FIG. 2.

FIG. 2 shows a conveyor line L1 made up of control units U (Ua, Ub, Uc) arranged in series in the conveying direction and each equipped with a zone controller 1 of the embodiment. FIG. 6 is a diagram showing wiring between the zone controllers 1 each provided in each of the control units U corresponding to the arrangement of the control units U. Referring to these figures, basic operations of the conveyor line L1 using the zone controller 1 of the embodiment is described.

For convenience of description, the zones for control will be distinguished by names of zone A, zone B and zone C, and a zone controller 1 provided in the control unit U (Ua, Ub, Uc) will be named zone controller 1a, 1b, 1c, respectively.

As shown in FIG. 6, each upstream connector 17 of the zone controller 1 in a zone is connected to the downstream connector 18 of the zone controller 1 in the upstream zone in series by connecting cables C.

Thus the zone controller 1b in the zone B receives the presence signals of the zone A and zone C via its terminal 17b and terminal 18a, respectively. The zone controller 1b also receives the driving status signal of the zone C via its terminal 18c. The presence signals and the driving status signal received by the zone controller 1b are inputted into its controlling section 10.

The controlling section 10, by taking the presence signal from its own zone (zone B) into account, as well as the received presence signals and the received driving status signal, determines the need of driving the driving roller (not shown). If it recognizes the need, it drives the driving roller by generating a controlling signal and transmitting it to the motor-controlling circuit 11.

Thus the basic operations for performing zero-pressure accumulating conveyance are carried out by an integrated conveyor line L1, in which each control unit Ua, Ub, Uc independently determines the need of driving each driving roller respectively.

Conveyor lines with a variety of constructions other than the above-described construction can be produced by using a control unit U equipped with the zone controller of the embodiment.

CONVEYOR LINE EXAMPLE 2

Figure 3:
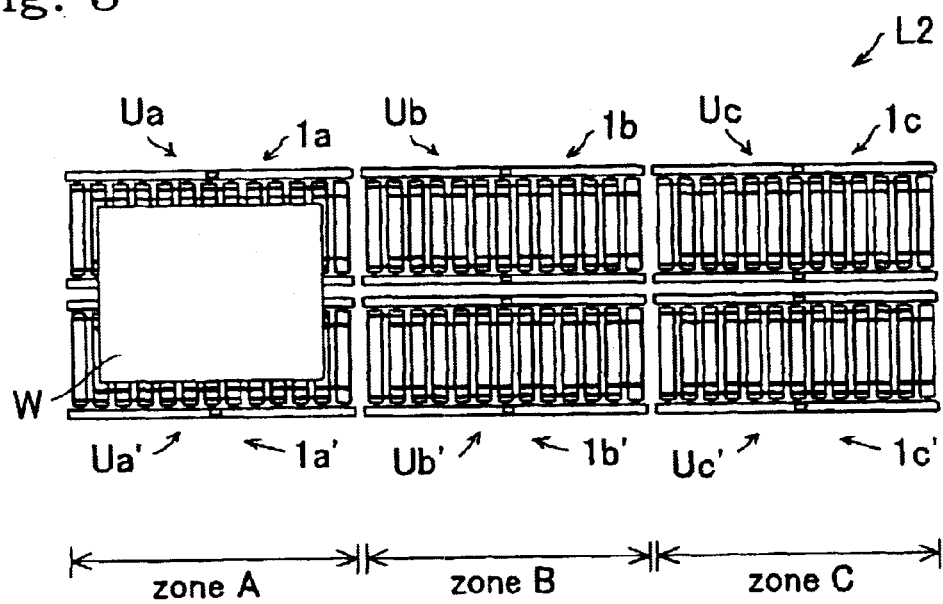
FIG. 3 is a plan view of another conveyor line made up of conveyor units each equipped with the zone controller shown in FIG. 1.

FIG. 3 shows a conveyor line L2 made up by arranging similar control units U (Ua, Ub, Uc) in series in the conveying direction and arranging similar control units U (Ua', Ub', Uc') side by side with the control units U (Ua, Ub, Uc), respectively.

Figure 7:
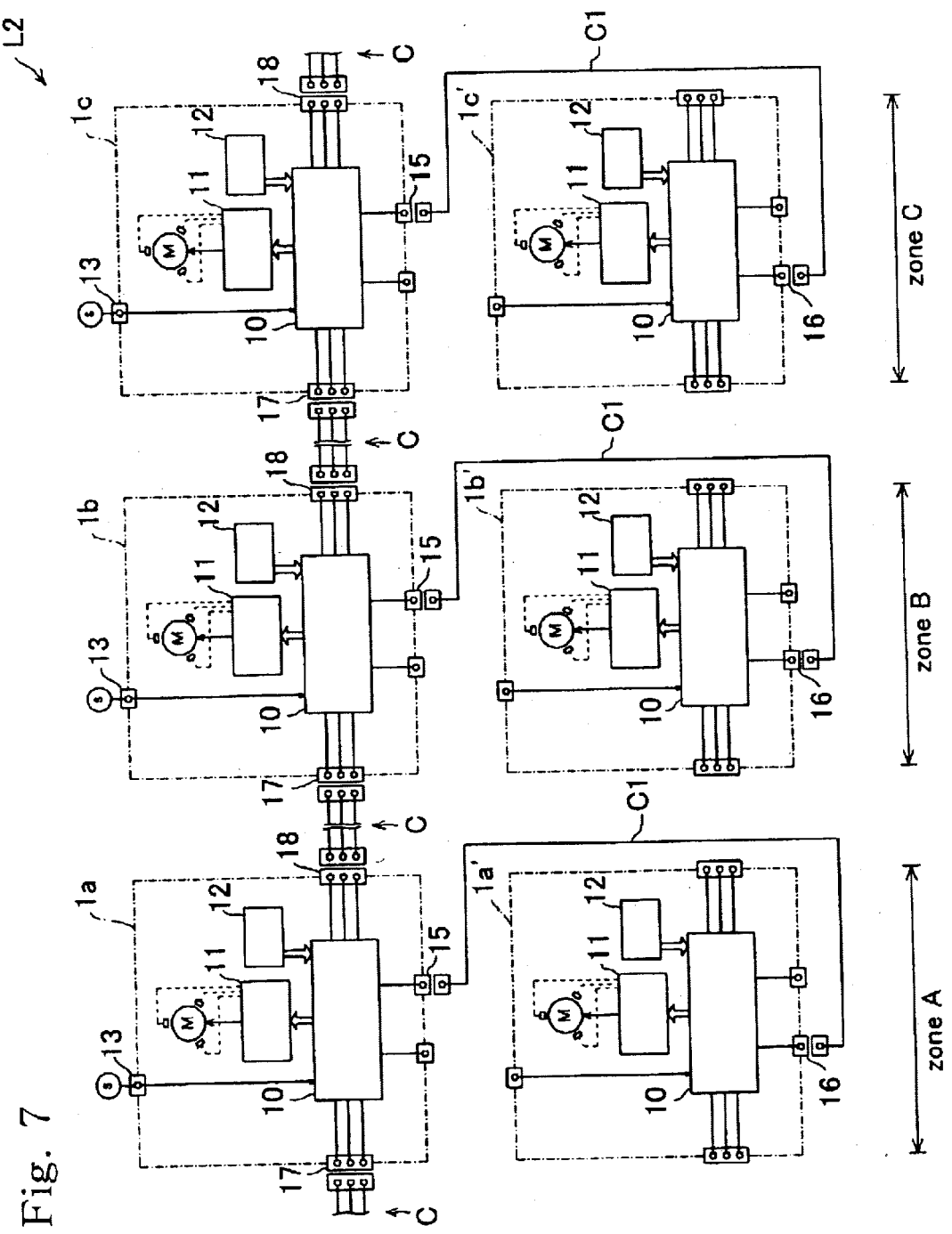
FIG. 7 is a wiring diagram of the zone controllers corresponding to the conveyor line shown in FIG. 3.

FIG. 7 is a diagram showing wiring between the zone controllers 1 each equipped with one of the control units U in the conveyor line L2 shown in FIG. 3 corresponding to the arrangement of the control units U.

In this arrangement, the same connection that is illustrated in FIG. 6 is made between the zone controllers 1a, 1b, and 1c. A connecting cable C1, that is, the second wiring, connects the output terminal 15 of the zone controller 1a and the input terminal 16 of the zone controller 1a'. Similarly, other connecting cables C1, C1 connect the output terminals 15, 15 of the zone controller 1b, 1c and the input terminals 16, 16 of the zone controller 1b', 1c', respectively.

The upstream connectors 17 and the downstream connectors 18 of the zone controllers 1a', 1b', 1c' are connected to nothing and the driving status signals outputted from the output terminals 15 of the zone controllers 1a, 1b, 1c are inputted into the input terminals 16 of the zone controllers 1a', 1b', 1c', respectively.

Thus the zone controllers 1a', 1b', 1c' performs a "slave" or "follower" control synchronized with the drive of the zone controllers 1a, 1b, 1c.

The conveyor line L2 has virtually broadened its width by linking and driving together the control units U adjoining sideways, i.e., orthogonal to the conveying direction.

Thus, as shown in FIG. 3, a conveyed article having a width larger than the width of the control unit Ua can stably be conveyed by being carried on both the control units Ua and Ua'. By being carried on both the control units Ua and Ua', a conveyed article having a weight over the limit of the control unit Ua can also be conveyed stably.

CONVEYOR LINE EXAMPLE 3

Figure 4:
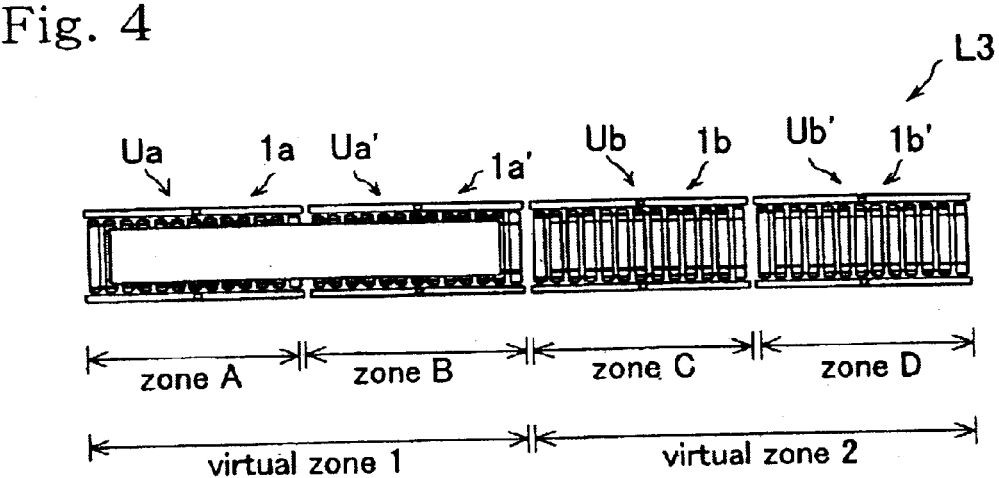
FIG. 4 is a plan view of yet another conveyor line made up of conveyor units each equipped with the zone controller shown in FIG. 1.

FIG. 4 shows a conveyor line L3 made up by arranging similar control units Ua, Ua', Ub, Ub' in a line in the conveying direction.

Figure 8:
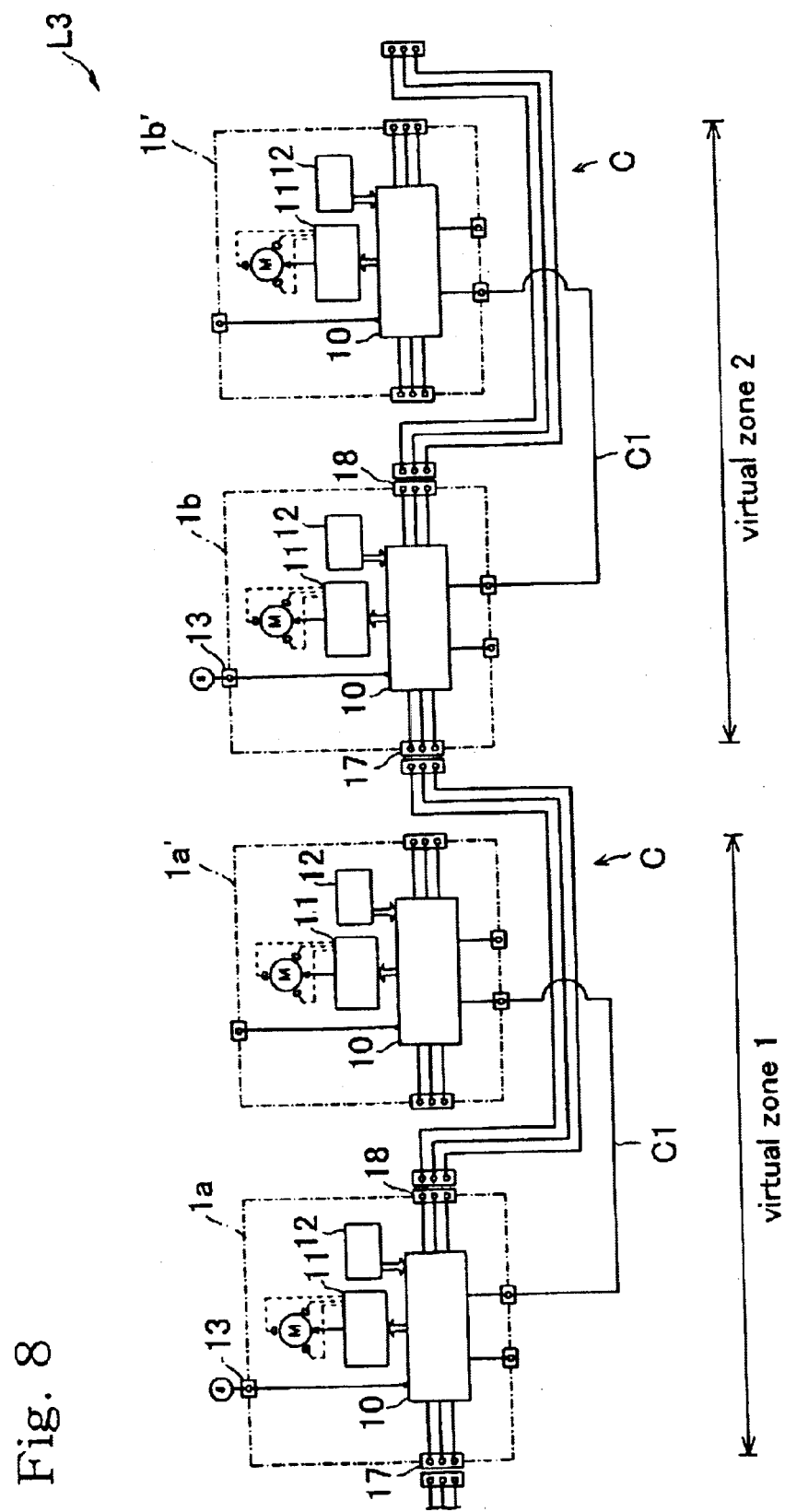
FIG. 8 is a wiring diagram of the zone controllers corresponding to the conveyor line shown in FIG. 4.

FIG. 8 is a diagram showing wiring between the zone controllers 1 each equipped with one of the control units U in the conveyor line L3 shown in FIG. 4 corresponding to the arrangement of the control units U.

The conveyor line L3 can be formed by rearranging the control units U of the conveyor line L2 shown in FIG. 3. Based on the arrangement in FIG. 3, the conveyor line L3 can be formed, with the control unit Ua' repositioned downstream of the control unit Ua and with the control unit Ub' repositioned downstream of the control unit Ub.

The conveyor line L3 has virtually duplicated the length of each zone A, B. Thus a conveyed article having a length over the length of each control unit U can also be conveyed stably in the zero pressure accumulation conveyance.

CONVEYOR LINE EXAMPLE 4

Figure 5:
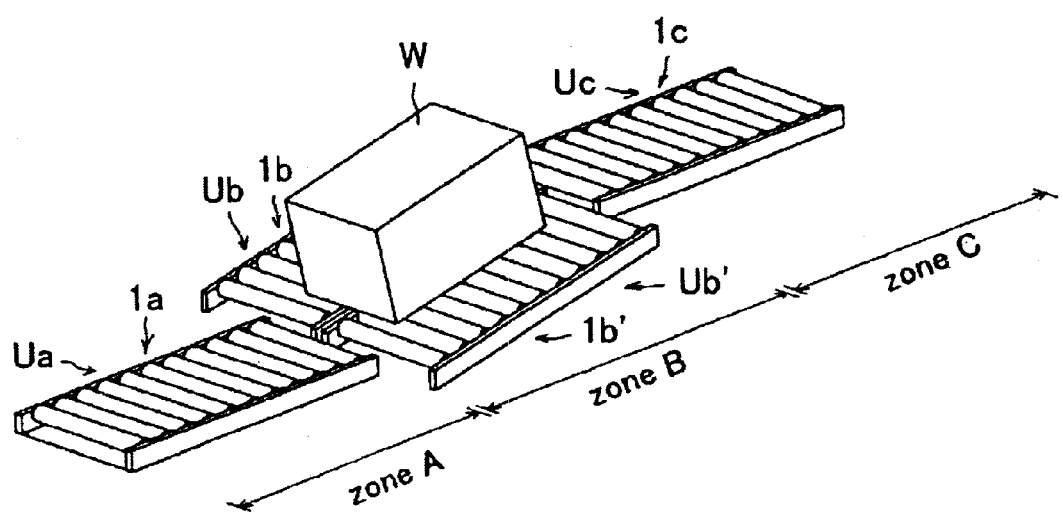
FIG. 5 is a perspective view of still another conveyor line made up of conveyor units each equipped with the zone controller shown in FIG. 1.

FIG. 5 shows a conveyor line L4 having an incline and made up of similar control units U (Ua, Ub, Ub', Uc). In the conveying line L4, the control unit Ub' is arranged side by side with the control unit Ub so as to facilitate conveyance in the incline in zone B. In other words, control units U are arranged so that an article W to be conveyed from a zone A to a zone B is lifted by being carried on both the control units Ub and Ub'.

Figure 9:
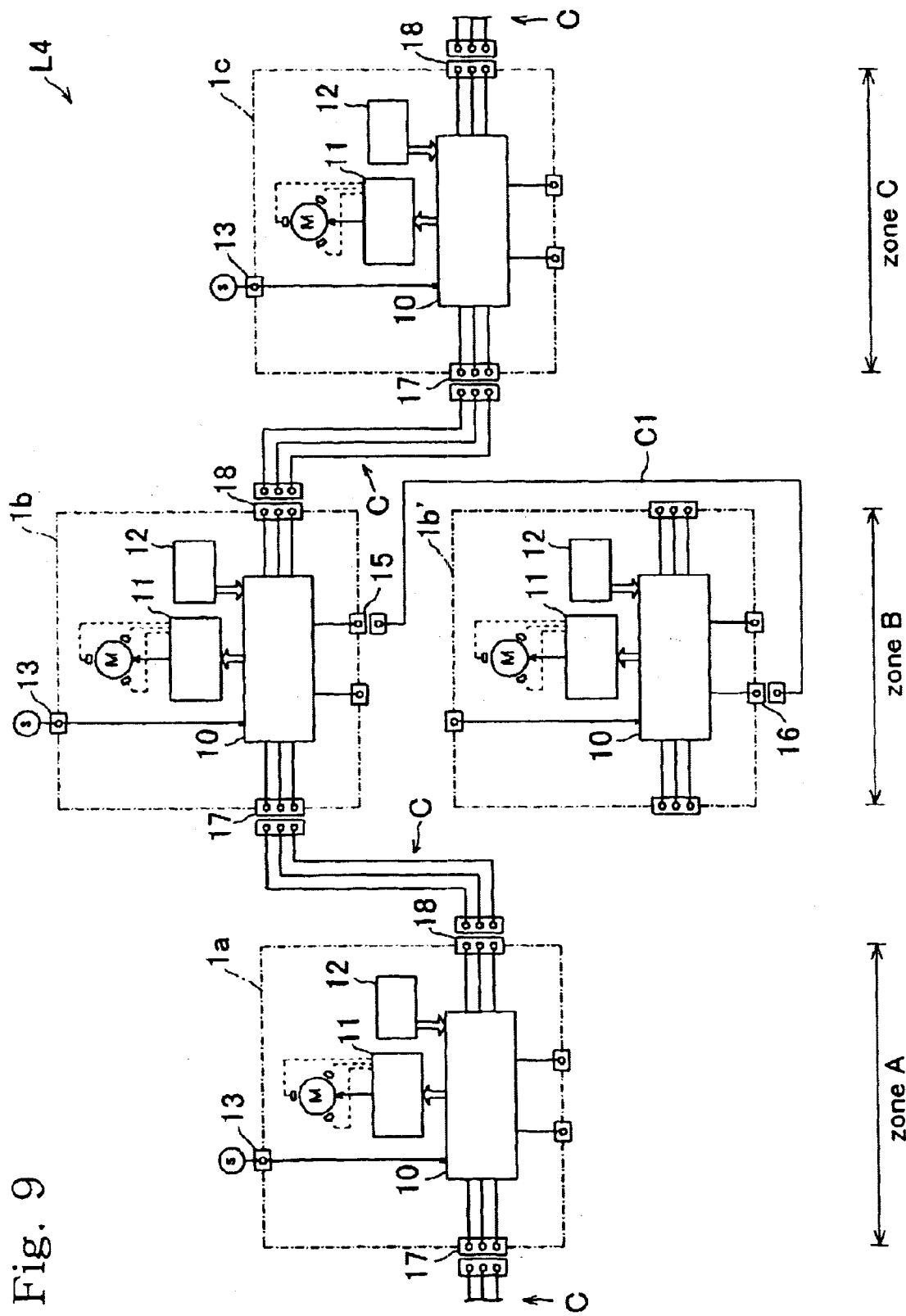
FIG. 9 is a wiring diagram of the zone controllers corresponding to the conveyor line shown in FIG. 5.

FIG. 9 is a diagram showing wiring between the zone controllers 1 each equipped with one of the control units U in the conveyor line L4 shown in FIG. 5 corresponding to the arrangement of the control units U.

Connections between the zone controllers 1a, 1b, and 1c are the same that are illustrated in FIG. 6. A connecting cable C1 connects the output terminal 15 of the zone controller 1b and the input terminal 16 of the zone controller 1b'.

In this conveyor line L4, the control unit Ub' in the zone B is driven linked with the control unit Ub. Thus, the article W can be lifted and conveyed by means of duplicated driving force generated by linking two control unit Ub and Ub' even if only one control unit Ub is insufficient to lift and convey the article W.

Though FIG. 5 has shown an example in which the zone B has an ascending slope, similar arrangement involving a descending slope enables conveyance with increased braking force.

A more detailed example of the zone controller 1 shown in the above-described embodiments will be described below.

Figure 10:
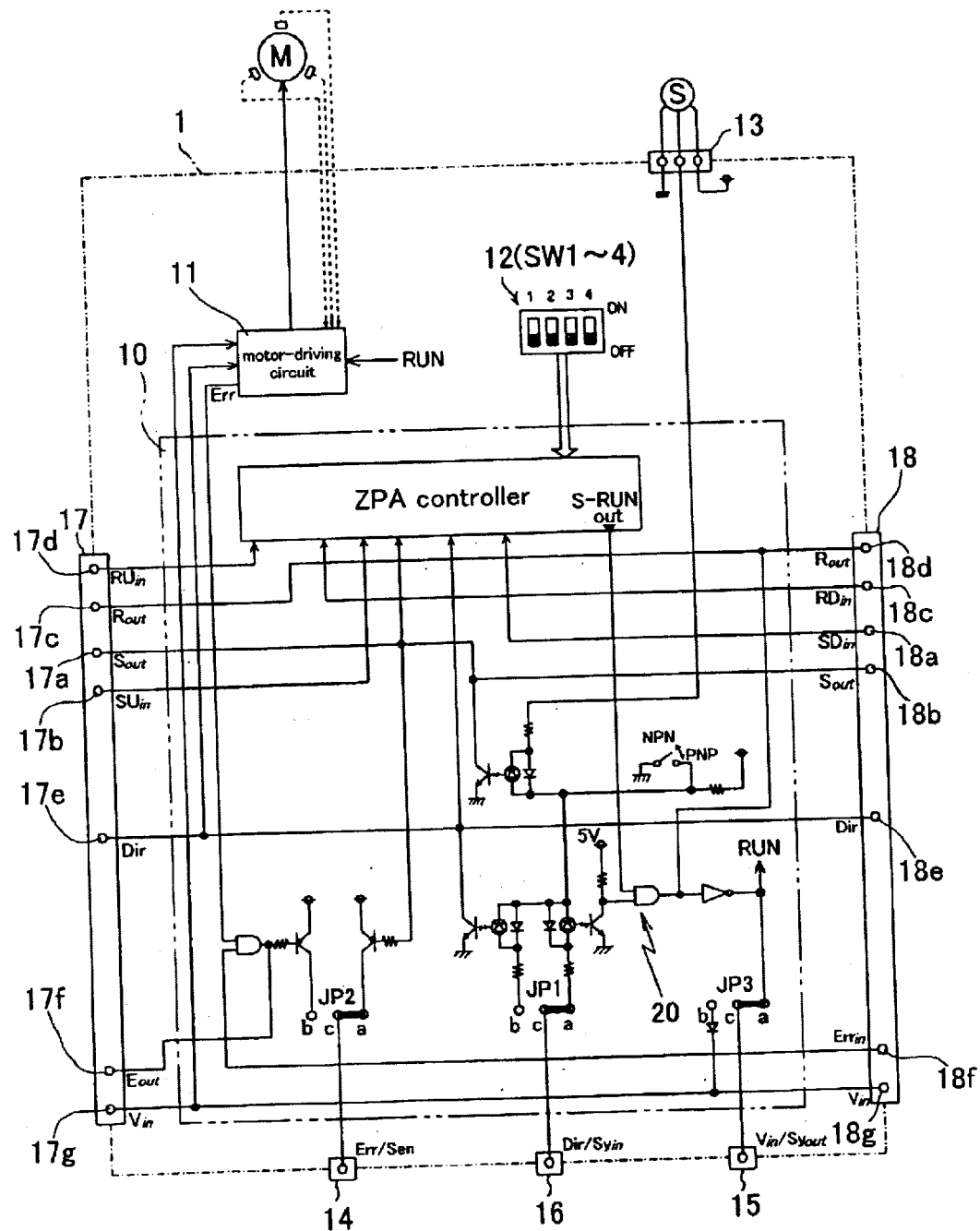
FIG. 10 is a circuit diagram of a zone controller embodying the invention.
Figure 11:
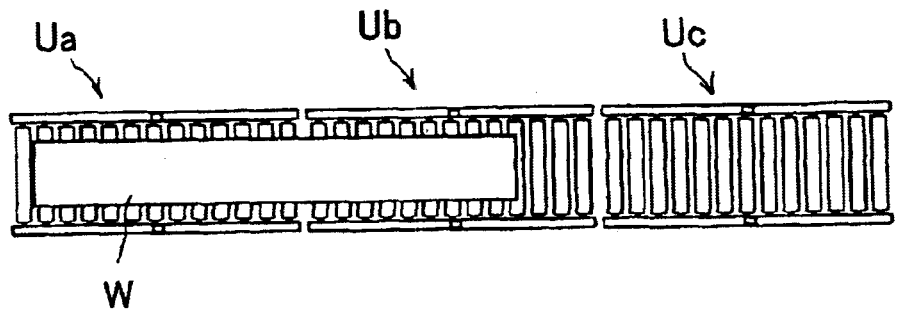
FIG. 11 is a plan view of a conveyor line made up of conventional conveyor units.
Figure 12:
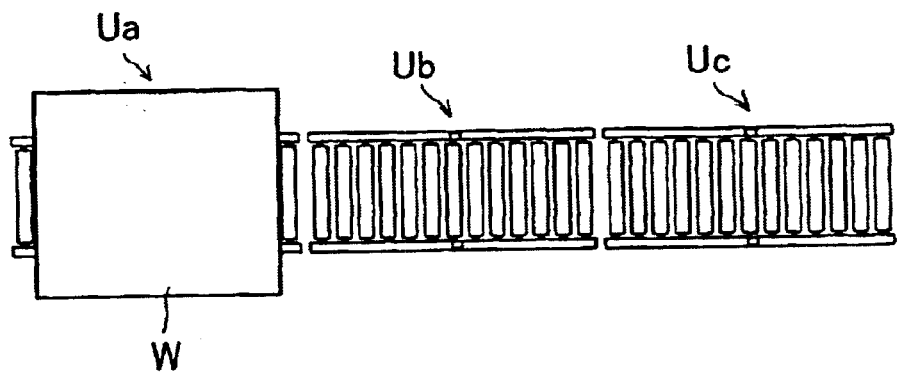
FIG. 12 is also a plan view of a conveyor line made up of conventional conveyor units.
Figure 13:
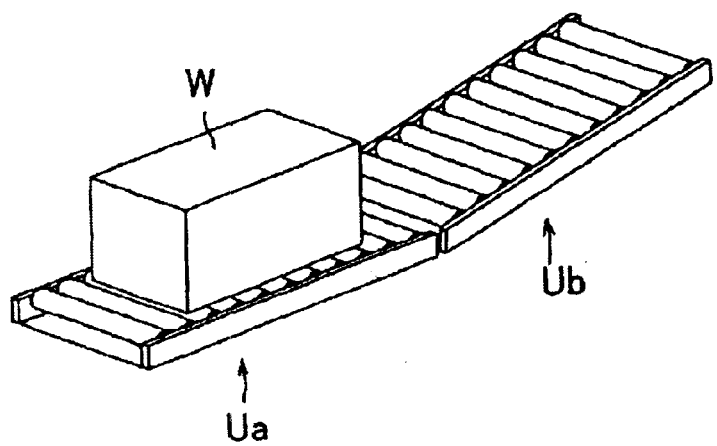
FIG. 13 is a perspective view of another conveyor line made up of conventional conveyor units.

FIG. 10 is a block circuit diagram showing a detailed internal structure of the zone controller 1 embodying the invention. Members corresponding with the members shown in FIG. 1 will bear the same numerals respectively and overlapping descriptions thereof will be avoided.

Each of the upstream connector 17 and the downstream connector 18 of the zone controller 1 in the example has seven terminals.

The upstream connector 17 transmits and receives the following signals to and from another zone controller 1 in the upstream.
(1) Presence signal Sout of its own zone outputted via terminal 17a.
(2) Presence signal SUin of an upstream zone inputted via terminal 17b.
(3) Driving status signal Rout of its own zone outputted via terminal 17c.
(4) Driving status signal RUin of an upstream zone inputted via terminal 17d.
(5) Conveying direction signal Dir transmitted via terminal 17e.
(6) Error signal Eout of its own zone and downstream zones outputted via terminal 17f.
(7) Conveying speed signal Vin transmitted via terminal 17g.

The downstream connector 18 transmits and receives the following signals to and from another zone controller 1 in the downstream.
(1) Presence signal SDin of a downstream zone inputted via terminal 18a.
(2) Presence signal Sout of its own zone outputted via terminal 18b.
(3) Driving status signal RDin of a downstream zone inputted via terminal 18c.
(4) Driving status signal Rout of its own zone outputted via terminal 18d.
(5) Conveying direction signal Dir transmitted via terminal 18e.
(6) Error signal Errin of downstream zones inputted via terminal 18f.
(7) Conveying speed signal Vin transmitted via terminal 18g.

By only bridging a set of cables between adjoining zone controllers 1, terminals 17a to 17g of the upstream connector 17 are connected to their counterpart terminals 18a to 18g of the downstream connector 18 of an adjoining controller respectively. Thus the above-described signals can be transmitted and received mutually between zone controllers 1.

The zone controller 1 further has three terminals 14 to 16.

A signal selected from a presence signal Sen of its own zone and an error signal Err of its own zone and downstream zones can be outputted via the terminal 14 by switching a jumper line JP2.

By wiring between points "c" and "a" (presence signal Sen side) through the jumper line JP2, the presence signal Sen outputted from the controlling section 10 is outputted from the terminal 14 via a transistor Q1, which is connected so that its collector is open.

By wiring between points "c" and "b" (error signal Err side) through the jumper line JP2, a signal representing the logical multiplication of an error signal outputted from the controlling section 10 and the error signal transmitted from downstream zones via the terminal 18$f$ is outputted from the terminal 14 via a transistor Q2, which is connected so that its collector is open. The signal representing the logical multiplication is also outputted via the terminal 17$f$ as the error signal Eout.

A driving status signal Syout (the third signal) of its own zone can be outputted, or the conveying speed signal Vin can be inputted, via the terminal 15, selectively by switching a jumper line JP3.

By wiring between points "c" and "a" (driving status signal Syout side) through the jumper line JP3, the driving status signal (the third signal) outputted from the controlling section 10 is outputted from the terminal (output terminal) 15. Simultaneously the signal is transmitted to a motor-controlling circuit 11 so as to control the driving motor M.

By wiring between points "c" and "b" (conveying speed signal Vin side) through the jumper line JP3, the conveying speed signal (Vin: 0 to 10 V of voltage) inputted via terminal 15 is inputted into the controlling section 10 and transmitted to other zone controllers 1 via terminal 17$g$ and 18$g$. In other words, by inputting the conveying speed signal Vin into a zone controller 1, the conveying speed signal Vin is transmitted to all the zone controllers 1.

A signal selected from the conveying direction signal Dir and a driving status signal Syin (the second signal) can be inputted via the terminal 16 by switching a jumper line JP1.

By wiring between points "c" and "a" (driving status signal Syin side) through the jumper line JP1, a driving signal RUN based on the driving status signal Syin transmitted from another zone controller via terminal 16 is transmitted to the motor-controlling circuit 11 so as to control the driving motor M.

By wiring between points "c" and "b" (conveying direction signal Dir side) through the jumper line JP1, the conveying direction signal Dir inputted via terminal 15 is inputted into the controlling section 10 and transmitted to other zone controllers 1 via terminal 17$e$ and 18$e$. In other words, by inputting the conveying direction signal Dir into a zone controller 1, the conveying direction signal Dir is transmitted to all the zone controllers 1.

The zone controller 1 has a control-setting section 12 for setting the controlling section 10, including switching the control of the section 10. The control-setting section 12 is formed by a DIP switch having four switches SW1 to 4.

The switch SW1 is capable of switching the input of the conveying speed signal Vin. In "on" setting, a speed control based on the conveying speed signal Vin inputted from outside via terminal 15 is performed, whereas in "off" setting, a speed control based on the conveying speed signal Vin generated inside is performed.

The switch SW2 is capable of setting the downstream end of the conveyor line. In "on" setting, conveying an article further to downstream is prevented so as to set the downstream end of the conveyor line, whereas in "off" setting, a usual control of conveyance is carried out.

The switch SW3 is capable of switching conveying modes of the controlling section 10. In "on" setting, a singulation conveying mode is performed, in which articles are conveyed with a predetermined number of zones preserved between the zones in which the articles exist, whereas in "off" setting, a slug conveying mode is performed, in which articles are conveyed down all together with the order of the articles preserved.

Though in the embodiment the control for performing the singulation and the slug conveying modes are carried out by means of a logic circuit incorporated in the controlling section, the conveying modes are capable of being carried out through program processing by means of a CPU.

The switch SW4 is capable of setting interface for the presence sensor S and the driving status signal and the conveying direction signal Dir both inputted via terminal 16, and capable of switching setting corresponding to an output for the output of an NPN or a PNP transistor.

The detecting signal of the presence sensor S is transmitted via a photocoupler PC1 to the controlling section 10, the terminal 17$a$, and the terminal 18$b$. If the jumper line JP1 is connected to the driving status signal Syin side, the driving status signal Syin inputted via the terminal 16 is transmitted via a photocoupler PC2 to the motor-controlling circuit 11. If the jumper line JP1 is connected to the conveying direction signal Dir side, the conveying direction signal Dir inputted via the terminal 16 is transmitted via a photocoupler PC3 to the controlling section 10, the terminal 17$e$, and the terminal 18$e$.

The switch SW4 can change the interface for the presence signal, the driving status signal, and the conveying direction signal.

By opening the switch SW4, the interface is adjusted so that an active input for an NPN transistor is inputted into each of the photocoupler PC1 to PC3 when the input side thereof is earthed. By closing the switch SW4, the interface is adjusted so that an active input for a PNP transistor is inputted into each of the photocoupler PC1 to PC3 when the input side thereof is connected to the voltage of an electric source (in this embodiment, connected to an open collector).

The controlling section 10 of the zone controller 1 incorporates a ZPA controller as a calculating circuit for receiving the signals inputted into the zone controller 1 and for generating and outputting the driving status signal (the first signal) based on the inputted signals. In the illustrated embodiment, the driving status signal RUin of an upstream zone, the driving status signal RDin of a downstream zone, a presence signal Sout of its own zone, the presence signal SUin of an upstream zone, the presence signal SDin of a downstream zone, and the conveying direction signal Dir of the downstream zone are inputted into the ZPA controller so as to generate and output a driving status signal S-RUN (the first signal).

Figure 14:
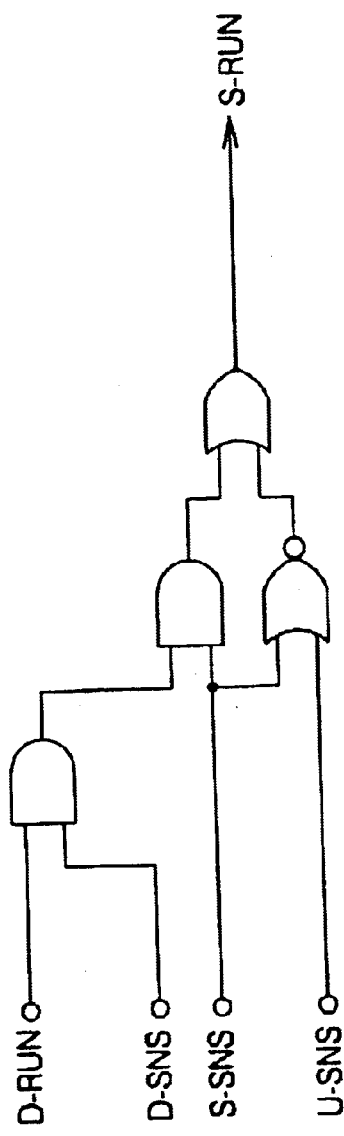
FIG. 14 is a large circuit view.

The ZPA controller can either be formed mainly of the logic circuit illustrated in FIG. 14 or another suitable circuit equivalent thereto, or be formed of a microcomputer with a software program. In FIG. 14, D-RUN is the driving status signal of a downstream zone controller, D-SNS is the presence signal of the downstream zone, S-SNS is the presence signal of its own zone, and U-SNS is the presence signal of an upstream zone. One of the signals RUin and RDin is used as D-RUN, depending on the value of the conveying direction signal Dir. Switching of these signals can be performed by means of a suitable switching circuit. Similarly, depending on the value of the conveying direction signal Dir, one of the signals SUin and SDin is used as D-SNS, whereas the other is used as U-SNS. The presence signal S-SNS of its own zone may be the signal Sout itself. Under the logic circuit illustrated in FIG. 14, a table of the logical values of the circuit is shown. Here, for each of the three presence signals, H level shows that an article exists and L level shows that an article does not exist. For each of the two driving status signals, H level shows "halt" and L level shows "drive". If both of the connectors 17, 18 to upstream and downstream is connected by no cable, the output S-RUN of the ZPA controller is set to H level.

The controlling section 10 incorporates a driving status signal generating circuit (a signal-generating circuit) 20, which generates and outputs the controlling signal (the third signal) based on two signals, i.e., the driving status signal S-RUN (the first signal), outputted from the ZPA controller, and the driving status signal Syin (the second signal), transmitted and inputted from other zone controllers via the input terminal 16. The controlling signal is the output signal of the controlling section 10. The circuit 20 consists mainly of an AND circuit that receives the signal S-RUN and a converted signal of the signal Syin and a NOT circuit that converts the output of the AND circuit. The output signal of the NOT circuit is used as the controlling signal RUN and the driving status signal Syout. As described above, the output signal S-RUN of the ZPA controller is at L level in "drive" and at H level in "halt". The controlling signal RUN and the driving status signal Syout (the third signal) shows "drive" by H level and "halt" by L level.

Therefore, for performing a slave control by the zone controller 1, the jumper line JP1 should connect the points "c" and "a", with no cable connected to the upstream and downstream connectors 17, 18. Thus, if a driving status signal Syin (the second signal) inputted from another zone controller is at H level showing the driving status, the output of the AND circuit is at L level as one input thereof is at L level, resulting that the output of the NOT circuit is at H level. Therefore, the driving status signal Syout and the controlling signal RUN (the third signal), both generated and outputted finally by the controlling section 10, show always the driving status regardless of the value of the driving status signal S-RUN outputted by the ZAP controller. On the other hand, if the signal Syin inputted from another zone controller is at L level showing halt, the output of the AND circuit is at H level as one input thereof is at H level and the output signal of the ZPA controller is also H level, resulting that the output of the NOT circuit is at L level. Therefore, the controlling signal RUN shows halt.

For performing a master control by the zone controller 1, no cable is connected to the terminal 16 so that terminal "a" of the jumper JP1 is at L level. Thus the photocoupler connected to the terminal "a" performs no function and makes the phototransistor "off". Thus, because 5V voltage of an electric source is inputted into the AND gate as an input signal at H level, the controlling signal RUN is outputted depending on the output signal S-RUN of the ZPA controller.

Using the control unit U equipped with the zone controller 1 of the invention facilitates forming of the conveyor lines L1 to L4 as shown in FIGS. 2 to 5.

An embodiment that provides a superordinate controlling device (not shown in the figures) controlling the whole conveyor line enables to control the conveying speed of the whole line by inputting a conveying speed signal Vin into the terminal 15 of any one zone controller 1.

Similarly, it enables to convert the conveying direction of the whole line instantaneously by inputting a conveying direction signal Dir into the terminal 16 of any one zone controller 1.

It also enables to survey the occurrence of error and to avoid disadvantage by transmitting an error signal Err to the superordinate controlling device.

Though FIGS. 1 and 10 illustrate a zone controller 1 having only one input terminal 16 into which the driving status signal is inputted, a couple of input terminals 16 wired mutually may be provided. This enables the driving status signal transmitted to one input terminal 16 to be transmitted further to other zone controllers 1 one by one via the other input terminal 16, thus enabling slave controls with a plurality of zone controllers 1 under a zone controller 1 performing the master control.

A variety of arrangements of conveyor lines other than the above-described conveyor line can be made.

For example, though FIG. 3 illustrates a conveyor line L2 made up of two parallel lines of control units U, a conveyor line made up of more than three parallel lines of control units U can be formed. Though FIG. 5 illustrates a conveyor line L4 with a zone B in which a plurality of control units Ub, Ub' are arranged, a conveyor line with zones A, C each having two control units and a zone B having three control units may be used.

The zone controllers according to the invention enable conveyance with a plurality of control units operating together, thus virtually enlarging zone for control, by only switching or rewiring. With this arrangement, a variety of conveyor lines adapted to shapes or weights of the articles to be conveyed are achieved, thus meeting more purposes.

What is claimed is:

1. A controller for controlling the operation of a driving motor for conveyance in a first conveyor unit, which forms a part of a conveyor line having at least one upstream conveyor unit and at least one downstream conveyor unit, each with a controller, the controller for the first conveyor unit comprising:

a calculating circuit for determining the need for actuating the driving motor, taking a predetermined parameter into account, so as to generate a first signal;

a first input terminal for input of a second signal from a controller for a conveyor unit other than the first conveyor unit;

a signal-generating circuit for generating a third signal based on the first signal and/or the second signal;

a second output terminal for output of the third signal to a controller for a conveyor unit other than the first conveyor unit;

a third terminal for inputting and outputting to and from a controller for an upstream conveyor unit at least one of a presence signal and a driving status signal; and a fourth terminal for inputting and outputting to and from a controller for a downstream conveyor unit at least one of a presence signal and a driving status signal, the controller for the first conveyor unit capable of being switched selectively between a) a master control mode and b) a slave control mode, wherein in the master control mode, the controller for the first conveyor unit is capable of i) generating and outputting the first signal for actuating the driving motor for the first conveyor unit with the need for actuating the driving motor determined by the calculating circuit, ii) generating the third signal based on the first signal and/or the second signal, and iii) outputting the third signal from the second output terminal to a controller for a conveyor unit other than the first conveyor unit so that operation of the controllers for the first conveyor unit and a conveyor unit other than the first conveyor unit can be synchronized, wherein in the slave control mode, the controller for the first conveyor unit is capable of i) receiving the second signal from a controller for a conveyor unit other than the first conveyor unit through the first input terminal, and ii) controlling the driving motor in the first conveyor unit synchronously with a controller for a conveyor unit other than the first conveyor unit, through the second signal.

2. The controller according to claim 1 further comprising a motor-controlling circuit connected to the driving motor and capable of receiving a signal, corresponding to the third signal, generated by a controller for a conveyor unit other than the first conveyor unit, generating a drive control signal for actuating or halting the driving motor based on the signal corresponding to the third signal, and outputting the drive control signal to the driving motor.

3. The controller according to claim 1,
wherein each of the first, the second, and the third signals is a digital signal representing one of drive and halt, and
wherein the signal-generating circuit generates a third signal representing drive if the second signal represents drive.

4. The controller according to claim 1,
wherein each of the first, the second, and the third signals is a digital signal representing one of drive and halt, and
wherein the signal-generating circuit generates a third signal representing drive regardless of the first signal if the second signal represents drive.

5. The controller according to claim 1,
wherein each of the first, the second, and the third signals is a digital signal representing one of drive and halt, and further comprising a setting device for setting the first signal compulsorily to represent one of drive and halt regardless of the parameter.

6. The controller according to claim 1,
wherein each of the first, the second, and the third signals is a digital signal representing one of drive and halt,
further comprising a plurality of external signal input terminals for receiving a parameter from outside of the controller, and
wherein, with no signal inputted via the external signal input terminals, the calculating circuit generates the first signal representing one of drive and halt, and the signal-generating circuit generates the third signal representing drive if the second signal represents drive and representing halt if the second signal represents halt, regardless of the first signal.

7. The controller according to claim 1, wherein the first input terminal and the second output terminal have connectors of the same shape.

8. A conveyor system comprising:
a first conveyor unit forming a part of a conveyor line comprising at least one upstream conveyor unit and at least one downstream conveyor unit, each with a controller; and
a first controller related to the first conveyor unit,
the first conveyor unit having a driving motor for conveying articles on the conveyor line,
wherein the first controller comprises:
a calculating circuit for determining the need for actuating the driving motor, taking a predetermined parameter into account, so as to generate a first signal;
a first input terminal for input of a second signal from a controller for other than the first conveyor unit;
a signal-generating circuit for generating a third signal based on the first signal and/or the second signal;
a second output terminal for output of the third signal to a controller for other than the first conveyor unit;
a third terminal for inputting and outputting to and from a controller for an upstream conveyor unit at least one of a presence signal and a driving status signal; and
a fourth terminal for inputting and outputting to and from a controller for a downstream conveyor unit at least one of a presence signal and a driving status signal,
the controller for the first conveyor unit capable of being switched selectively between a) a master control mode and b) a slave control mode,
wherein in the master control mode, the controller for the first conveyor unit is capable of i) generating and outputting the first signal for actuating the driving motor for the first conveyor unit with the need for actuating the driving motor determined by the calculating circuit, ii) generating the third signal based on the first signal and/or the second signal, and iii) outputting the third signal from the second output terminal to a controller for a conveyor unit other than the first conveyor unit so that operation of the controllers for the first conveyor unit and a conveyor unit other than the first conveyor unit can be synchronized,
wherein in the slave control mode, the controller for the first conveyor unit is capable of i) receiving the second signal from a controller for a conveyor unit other than the first conveyor unit through the first input terminal, and ii) controlling the driving motor in the first conveyor unit synchronously with a controller for a conveyor unit other than the first conveyor unit, through the second signal.

9. The conveyor system according to claim 8,
wherein the first controller further comprises a motor-controlling circuit connected to the driving motor and capable of receiving a signal, corresponding to the third signal, generated by a controller for a conveyor unit other than the first conveyor unit, generating a drive control signal for actuating or halting the driving motor based on the signal corresponding to the third signal, and outputting the drive control signal to the driving motor.

10. The conveyor system according to claim 8,
wherein each of the first, the second, and the third signals is a digital signal representing one of drive and halt, and
wherein the signal-generating circuit generates a third signal representing drive if the second signal represents drive.

11. The conveyor system according to claim 8, wherein each of the first, the second, and the third signals is a digital signal representing one of drive and halt, and
wherein the signal-generating circuit generates a third signal representing drive regardless of the first signal if the second signal represents drive.

12. The conveyor system according to claim 8,
wherein each of the first, the second, and the third signals is a digital signal representing one of drive and halt, and
wherein the first controller further includes a setting device for setting the first signal compulsorily to represent one of drive and halt regardless of the parameter.

13. The conveyor system according to claim 8,
wherein each of the first, the second, and the third signals is a digital signal representing one of drive and halt,
wherein the first controller further includes a plurality of external signal input terminals for receiving a parameter from outside of the controller, and wherein, with no signal inputted via the external signal input terminals, the calculating circuit generates the first signal representing one of drive and halt, and the signal-generating circuit generates the third signal representing drive if the second signal represents drive and representing halt if the second signal represents halt, regardless of the first signal.

14. The conveyor system according to claim 8, wherein the wherein the first input terminal and the second output terminal have connectors of the same shape.

15. The conveyor system according to claim 8, conveyor line further includes:

a second conveyor unit arranged in series with the first conveyor unit, a second controller related to the second conveyor unit, and a first wire electrically connecting an output terminal of the second controller and the input terminal of the first controller.

16. The conveyor system according to claim 8, wherein the conveyor line further includes:

a third conveyor unit arranged in parallel with the first conveyor unit, a third controller related to the third conveyor unit, and a second wire eclectically connecting an output terminal of the third controller and the input terminal of the first controller.

* * * * *